United States Patent [19]

Poerink

[11] Patent Number: 4,730,724

[45] Date of Patent: Mar. 15, 1988

[54] GEAR FOR A LINK CONVEYOR BELT

[75] Inventor: Nicholaas J. Poerink, Borne, Netherlands

[73] Assignee: Draadindustrie Jonge Poerink B.V., AA Borne, Netherlands

[21] Appl. No.: 848,892

[22] Filed: Mar. 24, 1986

Related U.S. Application Data

[63] Continuation of Ser. No. 618,772, Jun. 11, 1984, abandoned, which is a continuation of Ser. No. 330,368, Dec. 14, 1981, abandoned.

[30] Foreign Application Priority Data

Dec. 23, 1980 [DE] Fed. Rep. of Germany ....... 3048759

[51] Int. Cl.$^4$ ............................................. B65G 23/06
[52] U.S. Cl. ................................... 198/834; 474/156; 474/902; 474/903
[58] Field of Search ................ 198/834, 853; 474/206, 474/207, 153, 155, 156, 902, 903

[56] References Cited

U.S. PATENT DOCUMENTS

| 2,946,428 | 7/1960 | Baker | 198/834 |
| 3,672,488 | 6/1972 | Collins | 198/853 |
| 3,724,285 | 4/1973 | Lapeyre | 198/834 |
| 3,979,963 | 9/1976 | Goettl | 474/902 |
| 4,078,445 | 3/1978 | Kiser | 474/902 |

FOREIGN PATENT DOCUMENTS 528820  8/1956  Canada ............................. 198/834

Primary Examiner—Joseph E. Valenza
Attorney, Agent, or Firm—Felfe & Lynch

[57] ABSTRACT

A gear for a link conveyor belt system has a non-circular liner ring between a shaft of the system on which the gear is to be used and a hub of the gear. Preferably, the shaft, the liner ring, and the perimeter of the gear are configured correspondingly, and the dimensional tolerances between the liner ring and gear are relatively loose.

16 Claims, 3 Drawing Figures

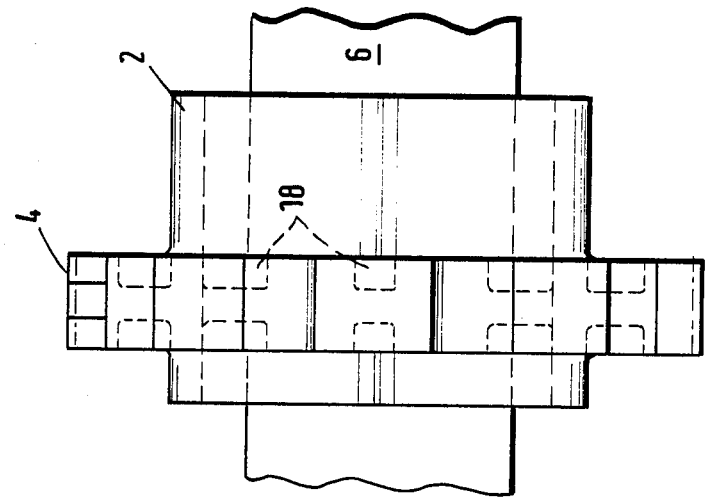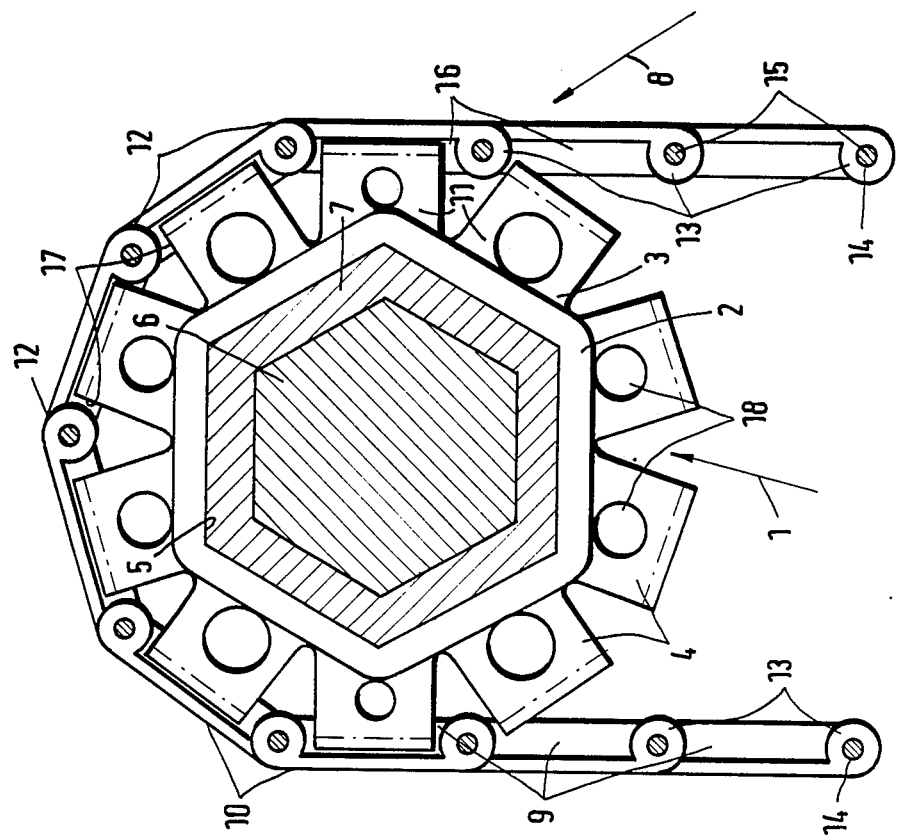

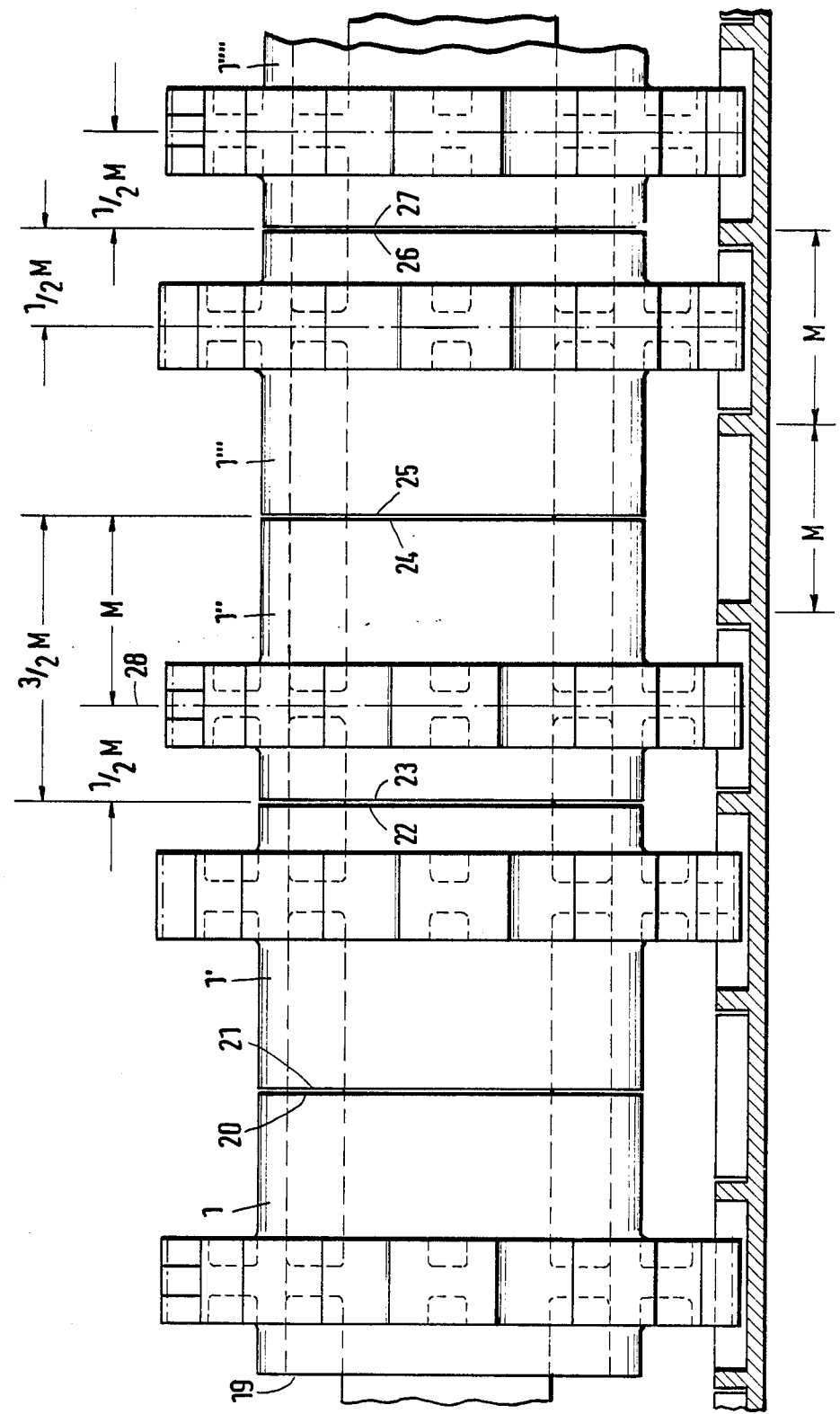

GEAR FOR A LINK CONVEYOR BELT

This application is a continuation of application Ser. No. 618,772, filed June 11, 1984, abandoned, which is a continuation of Ser. No. 330,368, filed Dec. 14, 1981 abandoned.

The present invention relates to a gear for a link conveyor belt and, especially said gear formed of plastics and having a hub arrangement cooperative with a driving or driven shaft.

In link conveyor belt systems, the individual components are, most frequently, modular. The modular components must normally be adapted to fit together quickly, without any particular expenditure of assembling work, and optionally, from identical basic modules.

These requirements are imposed also on the gears for the link conveyor belt systems, particularly because such systems are normally formed of plastic parts. The belt links and the gears of such systems are formed of plastics of different hardnesses.

In conventional constructions of link conveyor belt systems of this type, it has been customary to connect the gears releasably to the gear shafts, and particularly those which drive the gears, which splines or keys to transmit the torques, and particularly the torque peaks, positively under all circumstances, including jerky operating conditions. Occasionally, splined shafts according to DIN (German Engineering Standards) 5463 were also used to this end.

In connections of this and similar positive-engagement kinds, however, it is a drawback that local stress maxima were caused by the notch effect at the spline, key, or other positive-engagement structure, which stress maxima sometimes resulted in early fatigue and, thus, destruction thereof. Additionally, a connection of this type requires a high degree of mechanical precision, and, finally, also requires a relatively high expenditure of extremely careful and qualified assembling work.

All of these drawbacks and difficulties resulted in demand for a solution to the problems of connecting the gears, and particularly gears made of plastics shafts, for a link conveyor belt gears.

Accordingly, it is the object of the present invention to construct a gear, in terms of its specific design relative to its specific function, in such a manner that the gear may be assembled (mounted) and replaced easily and without problem, and particularly without requiring qualified operators; this should be possible without production methods involving a great deal of man-hours, and the connection should withstand even the most severe operating conditions, especially intermittent or jerky maximum loads or stresses in continuous operation, without fatigue phenomena; finally, a plurality of gears of this kind should be adapted, likewise without any assembly or production problem, to be united into a driving pulley, which pulley provides uniform engagement of all the gears with the links of a link conveyor belt system.

In a link conveyor belt system, this object is achieved, according to the present invention, in that a gear has a bore or aperture for receiving a shaft in torque-transmitting relationship the cross-sectional configuration of which, in a plane normal to a hub axis thereof, is different from a circular confirmation and has, particularly, the shape of a polygon.

Preferably, the polygon is a hexagon.

The shape of the bore offers the advantage of torque transmission with an unfinished hexagonal shaft for immense savings in production cost. Also, for a major part of the previously-necessary assembly work because unnecessary because the gear may be easily fitted onto the shaft and only requires fastening against axial displacement.

In a highly-advantageous embodiment, the spacing between adjacent gear teeth is equal to, or at least approximately equal to, the width of the links, from joint to joint, of the link conveyor belt with which the gear is used and each tooth has a profile matched (complementary) to the profile of a recess, preferably in the shape of a rectangle, in each link for receiving the teeth.

This construction provides optimum positive engagement between the gear and the link conveyor belt, contributes to silent operation, saves energy, prevents wear, and provides trouble-free long-time service of the conveyor belt system.

To further the modular system the hub bore is geometrically similar to, but substantially greater in size than the corresponding dimensions of the shaft on which it is used. At least one liner ring compensates for the differences in dimension when inserted into the hub bore between the hub bore and the shaft.

This measure results in significant savings in production, stock and space parts maintenance and, therefore, in a higher degree of flexibility or versatility at reduced costs.

Still further, in another advantageous embodiment, it is proposed (according to the invention) that the cross-sectional configuration of the hub bore corresponds geometrically to the configuration of the outer hub body, enlarged, of course, by the thickness of the hub body.

The particular configuration of the hub body provides the advantage of uniform stress distribution in the hub body and, thus, of a significant improvement of the durability, and saves material which also reduces weight.

Additionally, it is proposed that the hub bore is demensioned such that a relatively loose fit, preferably a slide fit, results between the hub and a correspondingly-shaped shaft or, obviously, the liner ring when used therein.

Particularly in the case of a gear formed of plastics material, this measure offers the advantage that "braking in" of the shaft/hub assembly is facilitated or promoted if minor shape or dimensional variations are present, whereby the running qualities of the conveyor belt system are improved.

Finally, likewise for reasons of facilitating the assembling, but also to facilitate the breaking in process and the self-alignment, it is proposed that the tolerances between hub and shaft are smaller towards the center of the hub than in the region of the end faces thereof.

The various features of novelty which characterize the invention are pointed out with particularity in the claims annexed to and forming a part of this specification. For a between understanding of the invention, its operating advantages and specific objects obtained by its use, reference should be had to the accompanying drawings and descriptive matter in which there is illustrated and described a preferred embodiment of the invention.

FIG. 1 is a side elevational view of a gear according to the present invention and part of a link conveyor belt, with a liner and the shaft illustrated in sectional view;

FIG. 2 is a view of the gear as viewed from a direction normal to the shaft axies; and FIG. 3 is a view of a multiple gear assembly on a common shaft, as seen in a direction normal to the shaft axis, with the gears being in engagement with a link of the link conveyor belt shown in sectional view.

The gear 1 shown in FIG. 1 comprises a hub 2 and a gear rim 3 including teeth 4. The hub 2 is provided with a bore (aperture) 5 of a hexagonal cross-section. As this bore 5, for reasons of standardizing its dimension within the scope of the type-standardized modular system, has larger cross-sectional dimensions than the associated shaft 6, an intermediate liner 7 is interposed between the bore 5 or hub 2 and the shaft 6, which liner is dimensioned, for example, with such tolerances to provide a slide fit with respect to bore 5, while having on all sides thereof a wider tolerance clearance of, for example, plus 0.4 mm relative to the shaft 6. Lacking the liner, the driving pulley including the gears 1, 1', 1", etc., (FIG. 3) would show the larger thickness dimensions matched to the bore 5, which might be expedient in the case of a shaft of a correspondingly long length for an extremely wide conveyor belt 8 or in the case of increased loads of conveynce. Gear 1 includes 10 peripherally spaced teeth 4 which teeth, engaging into recesses 9 in the lower side of each link 10 of the link conveyor belt 8, are conformed to the configuration of these recesses, and therefore show an approximately rectangular tooth profile 11. The recesses 9 are defined in gaps between the collars or eyes 13 forming the joints 12 of links 10, which collars or eyes meshingly joined in the form of hinge-type joints 12 per collar/gas/collar/gap unit by joint or hinge axles 15, so as to form a chain in this manner. Webbs provided between the collars or eyes 13 and interconnecting them laterally define the recesses 9 in axial direction and form, by a pair of collars or eyes each with a pair of bounding webs 16, a module defining the recess 9. In this structure, the spacing between the tooth flanks 17 and 17' is at least approximately equal to the spacing between joints 12 and 12'. It can be clearly seen from the illustration that the polygonal configuration in the hexagonal cross-section of hub bore 5 and shaft 6, including the correspondingly shaped intermediate liner 7, provides a positive engagement system for torque transmission, which ensures optimum torque transmission conditions even under severe circumstances, such as under jerky conditions of operation, etc., without requiring and further aids, such as splines, fitting keys or the like, to effect such torque transmission. Owing to the generous tolerances in the fits, no precise mechanical fitting work is required, and assembling is confined to the measure of slipping the gear with given number of further gears onto shaft 6 and fixing the gear in axial direction on the right hand and left hand sides between the bearings positioned on the outer side thereof.

FIG. 2 illustrates the same gear 1, as seen in a viewing plane rotated by 90° relative to FIG. 1. Shown are the shaft 6, on the latter hub including the gear rim 3, as well as material relief holes 81 in the material of the individual teeth 4.

According to FIG. 3, provided on the shaft 6 are four hubs 2, 2', 2", 2"' of gears 1, 1', 1", 1"', 1"", which hubs contact each other at their end faces 19 to 27. Shown in a purely schematical sectional view below this assembly is a link 10 of a link conveyor belt. There can be seen the recesses 9 defining the modules and having a width M corresponding to a module. This arrangement results in the matched dimensions form front face 23 to gear rim center 28 of ½ M; from gear rim center 28 to front face 24 of 1 M; from front face 23 to front face 24 of 3/2 M, etc.

Accordingly, the total width of a link conveyor belt is any desired multiple of the raster or screen dimensions of one hub width 3/2 M.

The terms and expressions which have been employed are use as terms of description and not of limitation, and there is no intention in the use of such terms and expressions of excluding any equivalents of the features shown and described or portions thereof, it being recognized that various modifications are possible within the scope of the invention.

What I claim is:

1. A modular construction comprising: a shaft for torque transmitting engagement and at least two gears, said gears being of plastic material and having a hub which is adapted to be slid on the shaft, said hub having a bore the cross-sectional configuration of which has, in a plane normal to the hub axis, the shape of a polygon, the hub having an outer body of a corresponding geometric cross-sectional configuration enlarged by the dimension of the material thickness of the hub body, said hub having opposite end faces defining a hub having an overall length of 3/2 M, said hub having an off-center gear rim with a center line spaced at ½ M from one end face of the hub and 1 M from the other end face of the hub, whereby said gear is adapted to be positioned relative to an adjacent gear on said shaft so that the distance between the gear rim center lines of adjacent gears is from 1 M to 2 M.

2. The modular construction of claim 1 wherein the distance between the gear rim center lines of adjacent gears is 1 M.

3. The modular construction of claim 1 wherein the distance between the gear rim center lines of adjacent gears is 3/2 M.

4. The modular construction of claim 1 wherein the distance between the gear rim center lines of adjacent gears is 2 M.

5. The modular construction of claim 1 wherein the hub bore of each gear has dimensions with a geometrically similar cross-sectional configuration, substantially larger than the respective dimensions of the shaft; and at least one intermediate liner between the hub and the shaft filling up the differences in dimension and adapted to be slid on the hub.

6. The modular construction of claim 5 wherein the polygon is a hexagon.

7. The modular construction of claim 1 wherein the shaft has a cross-sectional configuration complementary to that of the hub bore, and has tolerances relative to the bore such that a relatively loose fit, preferably corresponding to a sliding fit, results between the shaft and the hub.

8. The modular construction of claim 1 wherein the total length of the hub is equal to an integer multiple of 3/2 M.

9. A conveyor comprising: a conveyor belt, the belt being formed of links having hinge sleeves which are located in staggered relation at a front and rear end of the respective links, and are interconnected by rib-like webs, and define a plurality of side-by-side disposed modules having a dimension M; a modular construction adapted to engage said links to impart motion thereto, the modular construction comprising a shaft for torque transmitting engagement at least two gears, said gears being of plastic material and having a hub which is adapted to be slid on said shaft, said hub having a bore the cross-sectional configuration of which has, in a plane normal to the hub axis, the shape of a polygon, the hub having an outer body of a corresponding geometric cross-sectional configuration enlarged by the dimension of the material thickness of the hub body, said hub having opposite end faces defining a hub having an overall length of 3/2 M, said hub having an off-center gear rim with a center line spaced at ½ M from one end face of the hub and 1 M from the other end face of the hub, whereby said gear is adapted to be positioned relative to an adjacent gear on said shaft so that the distance between the gear rim center lines of adjacent gears is from 1 M to 2 M; and drive mean to impart motion to said shaft.

10. The conveyor of claim 9 wherein each gear of the modular construction has dimensions with a geometrically similar cross-sectional configuration, substantially larger than the respective dimensions of the shaft; and at least one intermediate liner between the hub and the shaft filling up the differences in dimension and adapted to be slid on the hub.

11. The conveyor of claim 10 wherein the polygon is a hexagon.

12. The conveyor of claim 9 wherein the shaft has a cross-sectional configuration complementary to that of the hub bore, and has tolerances relative to the bore such that a relatively loose fit, preferably corresponding to a sliding fit, results between the shaft and the hub.

13. The conveyor of claim 9 wherein the total length of the hub is equal to an integer multiple of 3/2 M.

14. The conveyor of claim 9 wherein the distance between the gear rim center lines of adjacent gears is 1 M.

15. The conveyor of claim 9 wherein the distance between the gear rim center lines of adjacent gears is 3/2 M.

16. The conveyor of claim 9 wherein the distance between the gear rim center lines of adjacent gears is 2 M.

* * * * *